L. P. MOSHER.
Sleigh Brake.

No. 98,993. Patented Jan'y 18, 1870.

UNITED STATES PATENT OFFICE.

LEVI P. MOSHER, OF STONEY CREEK, ASSIGNOR TO HIMSELF AND GEORGE Y. MILLER, OF LUZERNE, NEW YORK.

IMPROVED SLED-BRAKE.

Specification forming part of Letters Patent No. 98,993, dated January 18, 1870.

*To all whom it may concern:*

Be it known that I, LEVI P. MOSHER, of Stoney Creek, in the county of Warren and State of New York, have invented a new and useful Improvement in Sled-Brakes; and I do hereby declare that the following is a full, clear, and exact description thereof, which will enable those skilled in the art to make and use the same, reference being had to the accompanying drawings, forming part of this specification.

This invention relates to improvement in sled-brakes, such as are set into action by the holding-back action of the horses; and has for its object to provide a powerful brake, which, when the horses are drawing, will be supported close under the sleigh-bottom out of the way, and which, when brought into operation, will not cut up and derange the paths wherein the horses travel. It is also designed to provide, in conjunction with the said brakes, holding pawls or dogs, pivoted to the rear ends of the runners, to be operated by the same means, and which will also act as a brake.

Figure 1:
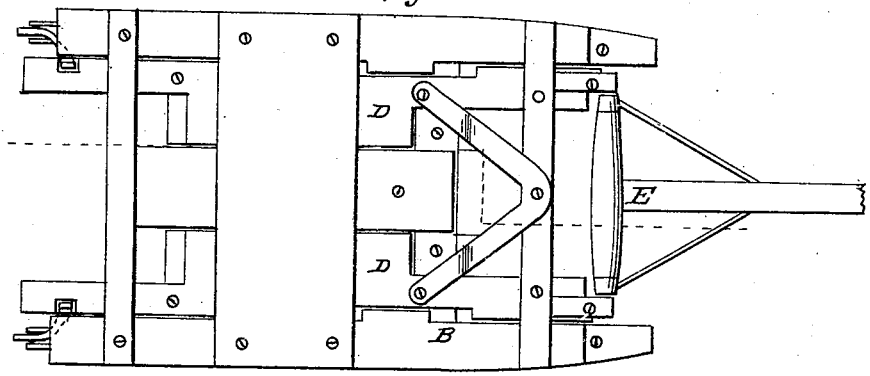
Figure 2:
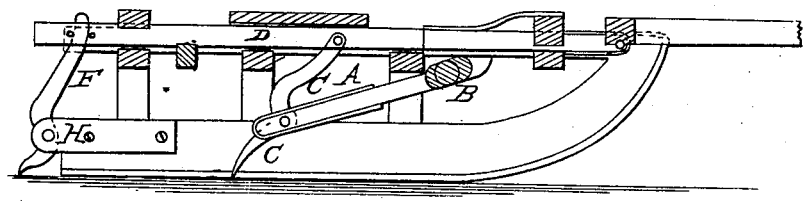
Figure 3:
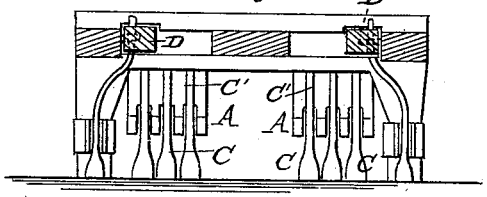

Figure 1 represents a plan view of a sled provided with my improvement. Fig. 2 represents a longitudinal section of the same. Fig. 3 represents a rear view.

A represents brake-supporting arms, supported on an oscillating shaft, B, supported in bearings transversely of the sled, and carrying at their rear ends brake-pawls C, having extension-arms C', joined at the upper ends to a frame, D, on the top of the beams, having a limited to-and-fro movement, and to which the tongues E are connected. These arms A are made broad enough to support two or more of the brake-pawls C, which are designed to be, unitedly, about as broad in the parts acting upon the ground as the paths of each side of the road for each animal, and to act thereon so as to smooth and pack the said paths, instead of cutting and destroying them.

The drawing action of the team on the tongue slides the frame D forward, so as to cause the extensions C' of the pawls C to draw the arms A up snugly under the bottom of the sled, so as to prevent any projecting parts to catch upon stumps, limbs of trees, or other things, and the holding-back action turns them down, so that the pawls engage with the ground.

In conjunction with these brakes I propose to employ similar brake-pawls F at the rear of the runners, pivoted thereto at H, and also connected with the slide-frame D by the upper ends, so as to operate in the wake of the runners, where the snow is packed very hard, not only as brakes, but also as holding-dogs for holding the sleigh while stopping when going up hills, the said pawls being engaged with the road-bed by causing the team to spring back suddenly when stopping on the said incline.

Having thus described my invention, what I claim as new, and desire to secure by Letters Patent, is—

The combination, with a sled, of a sliding frame, D, arranged for operation by the horse's shaft B, arms A, pawls C, C', and F, when arranged substantially as herein shown and described.

LEVI P. MOSHER.

Witnesses:
J. J. IVES,
G. Y. MILLER,
HOMER W. ROSS.